(12) United States Patent
Miller et al.

(10) Patent No.: US 6,453,438 B1
(45) Date of Patent: Sep. 17, 2002

(54) SYSTEM AND METHOD FOR AUTOMATICALLY RESCHEDULING A DATA TRANSMISSION TO MEMBERS OF A GROUP

(75) Inventors: C. Kenneth Miller, Concord, MA (US); Kenneth Cates, Salem, NH (US); Richard Fiorentino, Boylston, MA (US); Alan Rosenberg, Westford, MA (US)

(73) Assignee: The Fantastic Corporation, Lugano-Manno (CH)

( * ) Notice: Subject to any disclaimer, the term of this patent is extended or adjusted under 35 U.S.C. 154(b) by 0 days.

(21) Appl. No.: 09/385,746

(22) Filed: Aug. 30, 1999

Related U.S. Application Data (63) Continuation-in-part of application No. 09/274,574, filed on Mar. 23, 1999, which is a continuation-in-part of application No. 09/012,386, filed on Jan. 23, 1998, now Pat. No. 6,151,696, which is a continuation-in-part of application No. 08/585,948, filed on Jan. 16, 1996, now Pat. No. 5,727,002, which is a continuation-in-part of application No. 08/375,493, filed on Jan. 19, 1995, now Pat. No. 5,553,083.

(51) Int. Cl.$^7$ ................................................ H04L 1/16
(52) U.S. Cl. ...................................... 714/749; 709/227
(58) Field of Search ........................... 714/749; 709/227

(56) References Cited

U.S. PATENT DOCUMENTS

| | | | |
|---|---|---|---|
| 4,491,947 A | 1/1985 | Frank | 370/94 |
| 4,493,021 A | 1/1985 | Agrawal et al. | 364/200 |

(List continued on next page.)

FOREIGN PATENT DOCUMENTS

| | | |
|---|---|---|
| EP | 0 303 830 A2 | 2/1989 |
| EP | 0 437 072 A1 | 7/1991 |
| EP | 0 552 794 A2 | 7/1993 |
| EP | 0 632 671 A3 | 1/1995 |
| WO | 91/13503 | 2/1991 |
| WO | 95/26088 | 10/1995 |

OTHER PUBLICATIONS

International Searching Authority/European Patent Office, International Search Report, Dec. 5, 1996.
International Searching Authority/European Patent Office, Invitation to Pay Additional Fees and Partial International Search Report, Jul. 22, 1996.

(List continued on next page.)

*Primary Examiner*—Stephen M. Baker
(74) *Attorney, Agent, or Firm*—Darby & Darby (57) ABSTRACT

This invention relates to a system and method for managing a session during which data is sent to receivers, wherein retransmission of the data to the receivers can be automatically rescheduled if the receiver did not receive some or all of the data. An object of the invention is to send content to receivers that did not or could not receive data during a multicast data transmission session. In accordance with this and other objects of the invention, one aspect of the invention relates to a method of managing a session during which data is sent to receivers. A first message is sent over a network a message to a list comprising at least one receiver, the first message relating to receiving data during a first session. Replies are received over the network from the receivers on the list. Based on the replies received, each receiver on the list that will not be receiving data during the first session is identified. After the first session is complete, a second message is sent over the network to the receivers identified as not receiving data during the first session. The second message relates to receiving data during a second session. In this manner, receivers that did not receive data during the first session can automatically be invited to join a second session for receiving data when the first session is complete. Thus, the second session can serve as an automatic recovery session for those receivers that do not receive data during a regular data session.

23 Claims, 6 Drawing Sheets

U.S. PATENT DOCUMENTS

| | | | |
|---|---|---|---|
| 4,554,656 A | 11/1985 | Budrikis et al. ............... | 370/85 |
| 4,642,758 A | 2/1987 | Teng ........................... | 364/200 |
| 4,759,015 A | 7/1988 | Takai et al. .................... | 370/86 |
| 4,888,767 A | 12/1989 | Furuya et al. ............. | 370/95.2 |
| 4,914,654 A | 4/1990 | Matsuda et al. ........... | 370/94.1 |
| 4,937,819 A | 6/1990 | King .......................... | 370/95.3 |
| 4,979,165 A | 12/1990 | Dighe et al. ................... | 370/60 |
| 5,109,384 A * | 4/1992 | Tseung ....................... | 340/2.26 |
| 5,296,936 A | 3/1994 | Pittas et al. ................. | 358/407 |
| 5,404,505 A | 4/1995 | Levinson .................... | 395/600 |
| 5,491,691 A | 2/1996 | Shtayer et al. ................ | 370/61 |
| 5,553,083 A | 9/1996 | Miller ......................... | 371/32 |
| 5,572,678 A | 11/1996 | Homma et al. ........ | 395/200.12 |
| 5,696,764 A | 12/1997 | Soumiya et al. ............ | 370/395 |
| 5,727,002 A | 3/1998 | Miller et al. .................. | 371/32 |
| 6,002,852 A * | 12/1999 | Birdwell et al. ............ | 709/203 |

OTHER PUBLICATIONS

Draft Standard 802.1E, System Load Protocol, ANSI and Joint Technical Committee of the ISO and the IEC, 1990, 64 pages.

Comer, Internetworking with TCP/IP, vol. I, Principles, Protocols, and Architecture, Second Edition, Prentice Hall, 1991, Chapter 23, pp. 377–390.

Waters et al., Broadcast File Distribution Protocols for Satellite Networks, IEEE Telecommunications Conference, pp. 133–138, 1989.

Henriksen et al., A Transport Protocol Supporting Multicast File Transfer Over Satellite Links, International Phoenix Conference on Computers and Communications, pp. 590–596, 1992.

"IBM Japan Develops New Communication Protocol", news article, Nov. 3, 1995.

"TRIView Manger" brochure by Tactix ReEngineering, four pages.

A New ARQ–Scheme for Multicast Satellite Communication, by U. Quernheim et al., 3rd European Conference On Satellite Communications, Nov. 1993, pp. 11–15.

Electronics Letters, vol. 24, No. 11, May 26, 1988, "Continuous Multidestination ARQ Schemes For High Error-–Rate Channels", pp. 694–695.

"Host Extensions for IP Multicasting", by S. Deering, Aug. 1989, pp. 1–17.

"The Internet Multicasting Service", RELease 1.0, v94, n2, p10(6), Feb. 18, 1994, Dialog printout.

IEEE Computer Society, Oct. 1994, "Multicast Transport Protocols For High Speed Networks", by S. Paul et al., pp. 4–14.

IEEE Transactions on Communications, vol. 41, No. 12, Dec. 1993, "Optimal Adaptive Multireceiver ARQ Protocols"by Wang et al., pp. 1816–1829.

IEEE Transactions of Communications, vol. Com–33, No. 3, Mar. 1985, "Multidestination Protocols for Satellite Broadcast Channels", by Sabnani et al., pp. 232–240.

IEEE Transactions on Communications, vol. 41, No. 5, May 1993, "Error and Flow Control Performance of a High Speed Protocol", B. Doshi et al., pp. 707–720.

IEEE Transactions on Communications, vol. COM–33, No. 3, Mar. 1985, "Multidestination Protocols for Satellite Broadcast Channels", Sabnani et al., pp 232–240.

Stanford University, "Host Extensions for IP Multicasting", S. Derring, Aug. 1989, pp. 1–17.

3rd European Conference on Satellite Communications, Nov. 1993, "New ARQ–Scheme for Multicast Satellite Communication", Quernheim et al., pp–11–15.

Shacham, "Multipoint Communication by Hierarchically Encoded Data", INFOCOM 1992, pp. 2107–2114.

Shachum, "Multicast Routing of Hierarchical Data", 1992, pp. 1217–1221.

International Searching Authority/European Patent Office, International Search Report, Dec. 18, 1997.

Ken Miller et al., "Starburst Multicast File Transfer Protocol (MFTP) Specification," IETF Internet draft at www.ietf.org, Apr. 1998, pp. 1–52.

Starburst White Paper, "Starburst MFTP—An Efficient, Scalable Method for Distributing Information Using IP Multicast," available at www.starburstcom.com/white.htm, 1997, pp. 1–6.

* cited by examiner

Figure 6

SYSTEM AND METHOD FOR AUTOMATICALLY RESCHEDULING A DATA TRANSMISSION TO MEMBERS OF A GROUP

CROSS-REFERENCE TO RELATED CASES

This application is a continuation-in-part of U.S. patent application Ser. No. 09/274,574, filed Mar. 23, 1999, which is continuation-in-part of U.S. patent application Ser. No. 09/012,386, filed Jan. 23, 1998, now U.S. Pat. No. 6,151, 696, which is a continuation-in-part of U.S. patent application Ser. No. 08/585,948, filed Jan. 16, 1996, now U.S. Pat. No. 5,727,002, which is a continuation-in-part of U.S. patent application Ser. No. 08/375,493, filed Jan. 19, 1995, now U.S. Pat. No. 5,553,083 which is being re-examined as of Jun. 26, 1998 under U.S. Re-examination Control No. 90/005,028. Each of these patents and patent applications is incorporated by reference.

TECHNICAL FIELD

This invention generally relates to data transmission and to sending packets over a computer network. More particularly, it relates to a system and method for managing a session during which data is sent to receivers, wherein retransmission of the data to the receivers can be automatically rescheduled if the receiver did not receive some or all of the data.

BACKGROUND INFORMATION

Computer networks, such as wide area networks (WANs) using the Transmission Control Protocol/Internet Protocol (TCP/IP) protocol suite, can provide unicast, multicast, and broadcast services to allow communication between network participants such as a sender node and one or more receiver nodes. IP supports the sending of data to broadcast addresses, which are delivered to all hosts on the network or subnetwork at the expense of creating traffic over the total network. IP also supports multicast technology to communicate over a computer network. The term "broadcast" refers to a sender node sending information to all of the receiver nodes connected to the network. The term "multicast" refers to a sender node sending information to a subset of all of the receiver nodes connected to the network.

Some information providers provide information electronically by broadcasting or multicasting the information from a sender node at a central location to one or more receiver nodes at remote customer locations via a computer network to which the sender and the receivers are coupled. Computer networks and systems use several different protocols to accomplish reliable data distribution.

TCP/IP, one common protocol suite, presently is used with the Internet. The TCP part provides transport protocol functions to ensure that the total amount of bytes sent is received correctly at the other end. The IP part provides a routing mechanism. In addition, because TCP/IP is a routable protocol, the messages transmitted in accordance with TCP/IP contain the address of a destination network as well as a destination station. Thus, TCP/IP messages can be sent to multiple networks. Conventional TCP/IP reliable file transfer protocols support point-to-point (i.e., unicast) file distribution only. That is, packets are sent to each address in turn.

Most packets today are sent as unicasts (one to one) or broadcasts (one to all). Unicasts have a destination IP address that points to a single recipient. Broadcasts generally have a destination address for all hosts on a specific subnet (a component of a larger network). Multicast is a one to many type of data transmission that permits a sender to transmit a message to multiple recipients at the same time. Multicast is similar to broadcasting, except that multicast generally implies sending information to a list of specific users (e.g., a subset of all possible recipients), whereas broadcast generally implies sending a message to all possible recipients.

One relevant difference between a multicast packet and a unicast (or broadcast) packet is that the destination IP address in a multicast packet refers to an address corresponding to a group of hosts, rather than a specific network or specific host. Thus, multicast traffic on a network can be distinguished from unicast and broadcast traffic by examining the destination IP address, which in a multicast packet identifies the specific multicast group for which an IP packet was sent. For example, if a sender wants to send data to a group of receivers, the sender need only send the data to the particular multicast group address associated with that group. Because receivers in a group can listen at that address for messages, these receivers can receive the packets and process the contents.

Multicast networking and the applications providing one to many services using multicast are becoming important because multicast networks enable applications to scale; that is, multicast enables the applications to service many users without overloading network and sender resources. Widespread usage of applications servicing many users generally is not possible without the scaling provided by efficient network services such as those provided by multicast. Typical applications for reliable multicast data distribution include electronic software distribution, transmission of critical information to field offices, distribution of multimedia information to local senders, replication of web senders to the edges of networks for improved performance, and providing subscription based "push" information delivery to receivers who have signed up for a particular information service.

A multicast group is the group of host recipients that simultaneously receive data via the reliable multicast data transfer. IP multicast groups are dynamic and can be set up and torn down in seconds. IP multicast session setup protocols that have been standardized support two basic group models for two basic multicast applications. One group model is the conferencing model, in which a host is "invited" to join a conference, and a many to many multicast group is set up. This conference can be a videoconference, a data conference, or some other type of conference. A second group model is the broadcast model. This is analogous to television broadcast, where events and their times and "channels" are continuously broadcast over a particular channel, much as is done on many cable TV systems. Any receiver seeing an event may join the group and receive the information, in a manner analogous to tuning a TV receiver to the channel desired. Both of these models assume that anyone can access the groups with no restriction. There is no knowledge of group membership in the one to many group model, and there may not be knowledge in the conference model.

SUMMARY OF THE INVENTION

Efficient network technologies such as multicasting permit the same content to be sent electronically via a network to many host computers, which can be servers, desktops or mobile laptops. A problem that can occur when sending content to many destination computers, however, is that not all desired destination computers receive the content. This can occur if there was an outage of the destination computer or of the link to that computer, such that a destination computer would never be available for receiving content during a session. Another way that destination computers do not receive all content is when a session ends before the destination computer is finished receiving data, such that the destination computer received some of the content but not all.

The problem of not receiving content has serious implications for the destination computers. For example, the content being sent in some instances is content being sent to servers or other computers, such as crucial information that is required to be on many servers which are required to stay synchronized with the same content. In another example, the content being sent may be software that must be deployed and installed on one or more desktop computers, such as software needed to provide support services to the users and service personnel accessing the desktop computers.

For situations where a destination computer is unavailable for a session and for situations where a destination computer does not receive all data, it is an object of the invention to provide systems and methods for automatically scheduling a transmission to the group members that did not receive all or part of the content.

An object of the invention is to send content to receivers that did not or could not receive data during a multicast data transmission session. In accordance with this and other objects of the invention, one aspect of the invention relates to a method of managing a session during which data is sent to receivers. A first message is sent over a network to a list comprising at least one receiver, the first message relating to receiving data during a first session. Replies are received over the network from the receivers on the list. Based on the replies received, each receiver on the list that will not be receiving data during the first session is identified. After the first session is complete, a second message is sent over the network to the receivers identified as not receiving data during the first session. This message relates relating to receiving data during a second session. In this manner, receivers that did not receive data during the first session can automatically be invited to join a second session for receiving data when the first session is complete. The second session can, in one embodiment, serve as an automatic recovery session for those receivers that, for some reason, could not receive data during a regular data session, whereby those receivers can be invited again to receive data.

Embodiments of this aspect of the invention can include the following. In one embodiment, the steps of receiving replies, identifying receivers that will not be receiving data, and sending a message after the first session is complete can be repeated until a predetermined condition occurs, such as all receivers receive the data, a time limit is reached, or a message is received from a receiver indicating that the receiver is ready to receive data. In another embodiment, the step of identifying each receiver can further comprise identifying each receiver that did not reply to the first message relating to receiving data during a first session or that or that sent a reply indicating that it will not receive additional data during the first session. In another embodiment, the method can further include the step of identifying, based on the replies received, a reason for why a receiver will not receive data during the first session. In still another embodiment, the first and/or second messages inviting receivers can be sent to a group address location accessible to the receivers.

In another aspect, the invention relates to managing a session during which data is sent to receivers. A first message is sent over a network to a first list comprising one or more receivers. The first message relates to receiving data during a first session. Replies are received over the network from the receivers on the first list. Based on the replies received, each receiver on the first list that will not be receiving data during the first session is identified. After the first session is complete, a second message is sent over the network to the receivers identified as not receiving data during the session, where the second message relates to receiving data during a second session. After the sending of data during the first session has begun, those receivers that did not receive all data during the first session are identified. After the first session is complete, a third message is sent over the network to those receivers identified as not receiving all data during the first session, where the third message relates to receiving missing data during a third session. The second and third sessions can, in one embodiment, serve respectively as automatic recovery sessions for those receivers that, for some reason, either could not receive data during the first session or did not receive all data during the first session. Those receivers can be invited again to receive data during the second and/or third sessions.

Embodiments of this aspect of the invention can include the following features. In some embodiments, the process may be repeated until all receivers have received all of the data. In some embodiments the second message is sent before the first session is over.

In still another aspect, the invention relates to managing a session during which data is sent to receivers. A first message is sent over a network to a first list comprising one or more receivers. The first message relates to receiving data during a first session. Replies are received over the network from the receivers on the first list. Based on the replies received, whether or not each receiver on the first list will be receiving data during the first session is determined. A second list is established comprising those receivers that will not be receiving data. After the sending of data during the first session has begun, those receivers that did not receive all data during the first session are identified. A third list is established comprising those receivers that did not receive all data during the first session. After the first session is complete, a second message is established that includes a fourth list that comprises at least one of the second list and the third list. The second message relates to receiving data during a second session. After the first session is complete, the second message is sent to those receivers identified on the fourth list. Thus, this aspect of the invention permits automatic data recovery sessions to be established for those receivers that could not receive data at all during a session and/or for those receivers that received incomplete data during a session.

Embodiments of this aspect of the invention can include the following features. In some embodiments, the second message is sent to all receivers on the second list and the third list. That is, the message relating to receiving data during a second session it sent to those receivers that did not receive data at all during the first session and those receivers that did not receive all data during the first session. In some embodiments, the process is repeated until a predetermined condition occurs, such as when all receivers have received all the data. In other embodiments, the first and second messages can relate to receiving data over the network at first and second rates, where the first and second rates may be different. In still other embodiments, the second message may be sent after a time delay.

In still another aspect, the invention relates to managing a session during which data is sent to receivers. A reply is received over a network from at least one receiver receiving data over a network during a first session. The reply indicates that the receiver will no longer receive data. If the reply included a loss rate, another message is established that includes a list comprising receivers having loss rates that are substantially equivalent. This list is associated with a second session for sending data at a rate that is based on the loss rate received in the reply from the receiver. After the first session is complete, each message that was established to correspond to a loss rate is sent to the list of receivers having substantially equivalent loss rates. Thus, this aspect of the invention permits different automatic recovery sessions to be established based on the loss rates experienced by receivers. This aspect of the invention can be useful in reducing congestion on a network.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. The drawings are not necessarily to scale, emphasis instead being placed on illustrating the principles of the present invention.

DESCRIPTION

Reliable multicast data transfer, such as that specified in the Multicast File Transfer Protocol (MFTP) offered by Starburst Communications Corp., of Concord, Mass., allows packets to be sent to several host recipients simultaneously. A multicast group is the group of host recipients that simultaneously receive data via reliable multicast data transfer. Commonly assigned and co-pending U.S. patent application Ser. No. 09/274,574, filed Mar. 23, 1999 describes a session set up model called the closed group session model (the contents of this application are incorporated by reference). In this model, the superset of possible recipients (also called hosts) listens to an ANNOUNCE multicast address and the sender invites a certain subset of these recipients, called a closed group, to participate in a session by joining the closed group and registering with the sender. As a part of this process, the ANNOUNCE message also includes a different multicast address for which the transfer will be sent, the rate of the transfer, and the time allowed for the session.

Session setup of multicast applications generally uses a separate multicast group address. Members of a group are called hosts. As used in this specification, a sender is an entity that sends data; the term "sender" is used interchangeably with the term "server." Likewise, a receiver is an entity that receives data, and the term "receiver" is used interchangeably herein with the terms "client," and the term "host." Note that, in some implementations of reliable multicast, such MFTP, a computer system can act in some instances as a sender of data and in other instances as a receiver of data. This is because the MFTP implementation defines both a send function (the sender), which only transmits data products, and a receive function (the receiver), which only receives data products. Either or both functions can be provided in the MFTP implementation of reliable multicast. Thus, depending on which function is being used, a computer could be configured as either a receiver or a sender at any particular time. However, regardless of the implementation of reliable multicast being used, the present invention assumes that the computer configured as a sender and the computer configured as a receiver remain in that relationship with each other while data is being exchanged between them.

Moreover, references made herein to a receiver and/or a receiver will refer to the host, as well. As used in this specification, a sender is the entity that transmits a multicast message, and a receiver is the entity that receives a multicast message. Typically, receivers are identified by their IP address or alternatively by a special Global ID which in one embodiment is in the form of a Class E IP address, (IP address space not currently used). A Global ID is an alternative method for identifying a host that may not have a permanent IP address. For example, a Global ID can have the format of a Class E IP address, 32 bits long.

Figure 1:
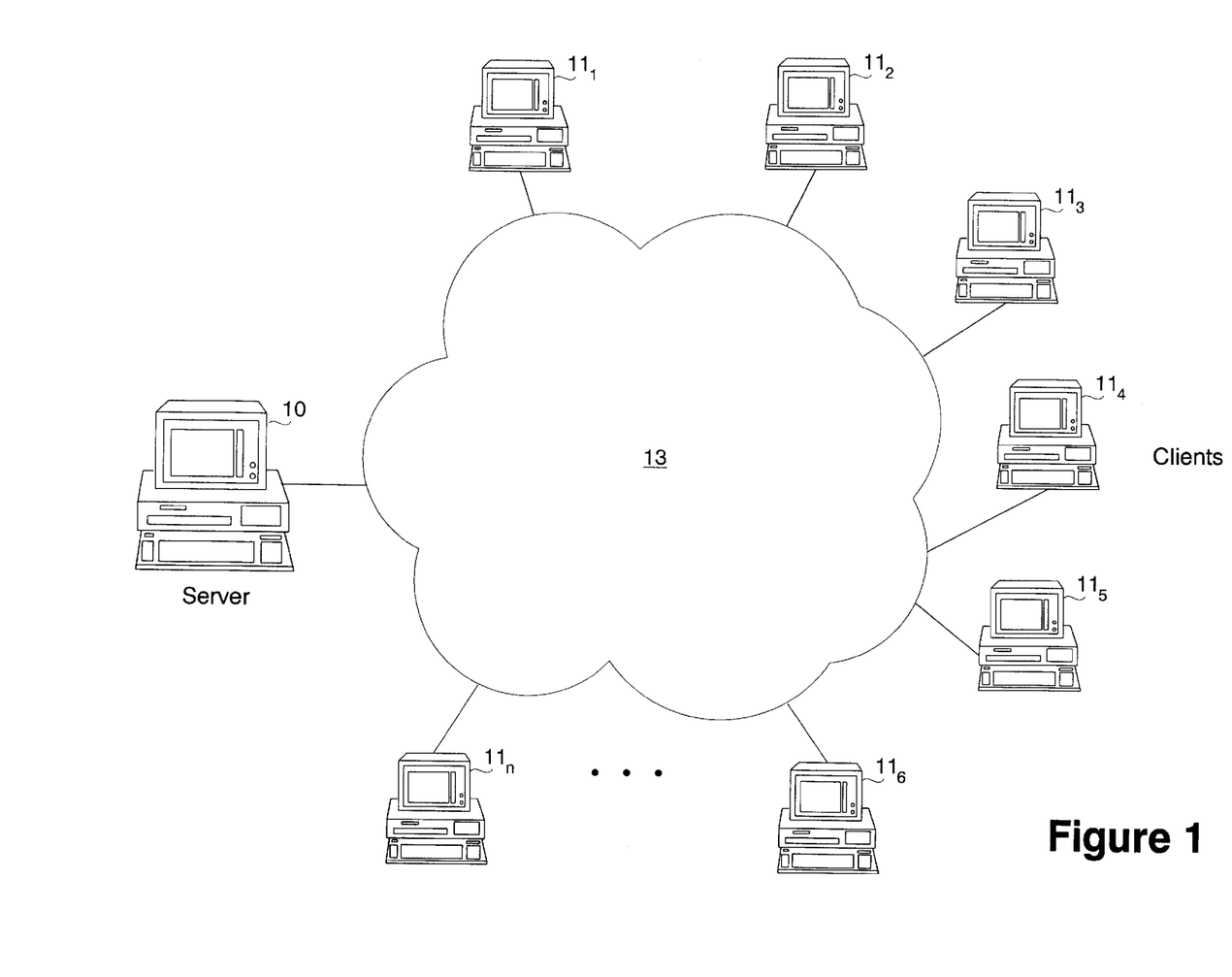
FIG. 1 is a simplified diagram of a physical configuration that allows a sender to communicate with one or more receivers.

FIG. 1 illustrates, in accordance with the invention, a basic diagram of quick and reliable data transmission from a source or sender 10 to one or more recipients or receivers or receivers $11_1, 11_2, \ldots 11_N$ over a communications link 13. In the first pass, the sender 10 preferably either broadcasts the file to all of the receivers 11 or multicasts it to a subset of all of the receivers 11. The link 13 can be a computer network (e.g., a LAN, a WAN, the Internet), a wireless network (e.g., a cellular data network), some combination of these two types of communication mediums, or some other communication medium. The plurality of frames transmitted over the link 13 during the first round can together represent a computer data file being transferred from the sender 10 to one or more of the receivers 11.

Figure 2:
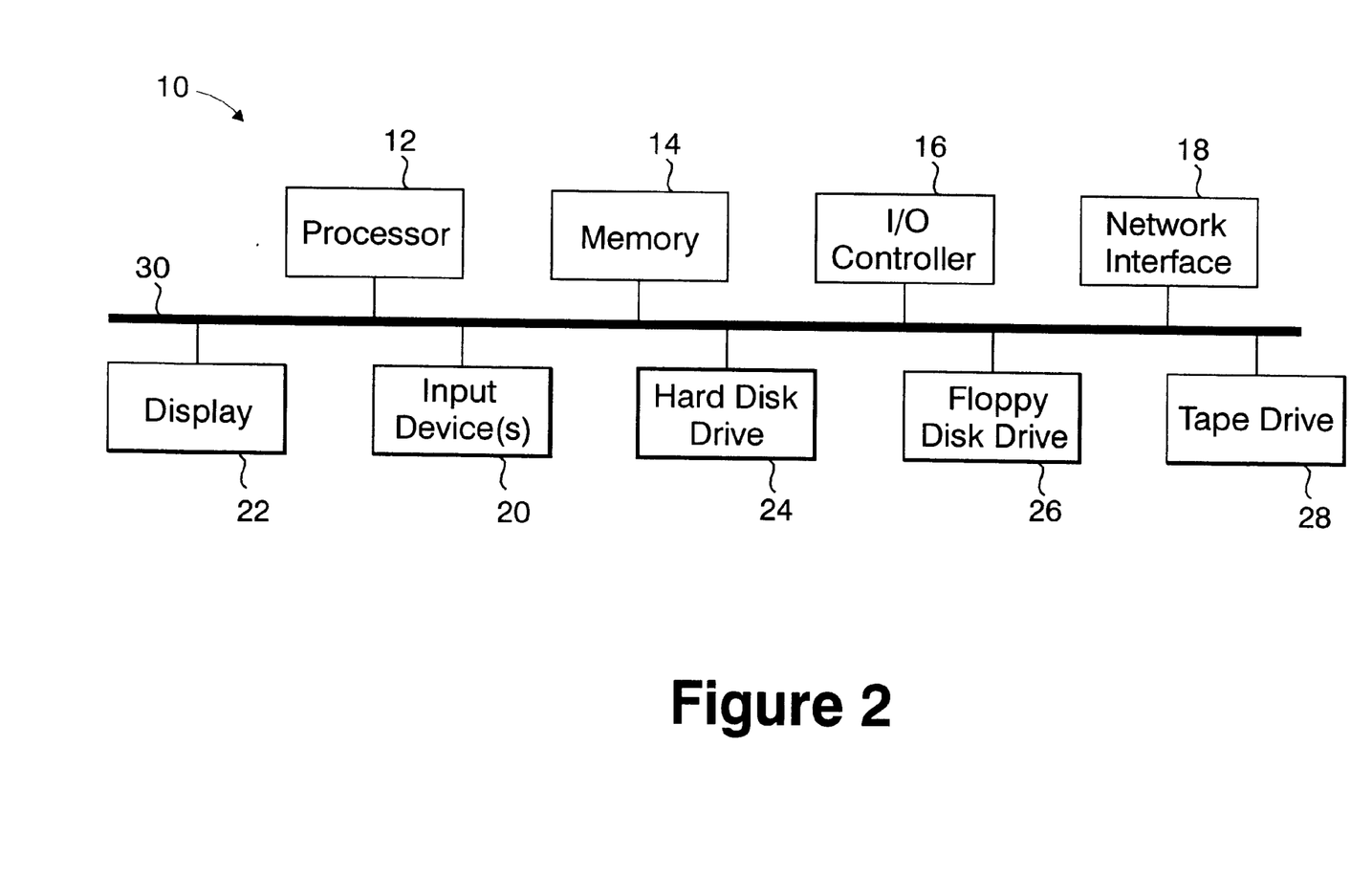
FIG. 2 is a simplified block diagram of a computer system in which at least a portion of the present invention can be embodied.

The sender 10 and the receivers 11 can be computers, such as PCs or workstations, running any one of a variety of operating systems. Referring to FIG. 2, the sender 10, regardless of what type of computer it is, typically includes a central processor 12, a main memory unit 14 for storing programs and/or data, an input/output controller 16, a network interface 18, one or more input devices 20 such as a keyboard and a mouse, a display device 22, a fixed or hard disk drive unit 24, a floppy disk drive unit 26, a tape drive unit 28, and a data bus 30 coupling these components to allow communication there between. Each of the receiver computers 11 generally includes all or some of the components included in the sender 10 of FIG. 1, as shown in FIG. 2.

In some embodiments, one or more computer programs define the operational capabilities of the sender 10 and the receivers 11. The programs can be loaded into the sender 10 and the receivers 11 via the hard drive 24, the floppy drive 26, and/or the tape drive 28. Alternatively, the programs can reside in a permanent memory portion (e.g., a ROM chip) of the main memory 14. In some other embodiments, the sender 10 and/or the receivers 11 can include specially designed, dedicated, hard-wired electronic circuits that perform all functions described herein without the need for instructions from computer programs. The invention can be used, for example, to load quickly and reliably new revision levels of the receiver software electronically from the sender 10 onto one or more of the receivers 11.

Group management deals with how receivers learn about and are joined to the public and private groups. Closed groups are a form of group management where the sender 10 specifies the receivers 11 that are allowed to participate in the data transfer. All other receivers 11 are prohibited from receiving the data. In the closed model, the sender 10 knows in advance which receivers 11 are authorized to receive a data transmission. This allows the sender 10 to tightly control group membership. In addition, as will be explained below, this permit the sender to set up separate data sessions to send data to those receivers 11 that did receive all or part of the content sent during the data transfer.

With closed groups, the sender (e.g., a sender 10) creates a list of receivers (typically, each receiver corresponds to a receiver 11) that is a subset of the number of receivers that are listening to the ANNOUNCE multicast address. The public address may be known and configured in advance at the receivers or the sender may use the multicast protocol to direct receivers to join the public group. Thus, this type of group management is called closed group because the sender restricts the membership of the group.

Product announcement is the process of letting the receiver population know that a product is about to be transmitted. In the ANNOUNCE phase, the sender announces to the receivers 11 that a file is about to be transferred and provides the parameters associated with the transfer of the file. That is, at a time determined by a user application at the sender, a data product transmission is "announced" to the receivers. The sender transmits the ANNOUNCE message for this purpose. If multicast is being used, the message is sent to the public address. Otherwise, the message is sent in unicast or broadcast mode. The message identifies the product name, type, and other information about the transfer.

During session setup in multicast, an announcement (e.g., an ANNOUNCE message) is the process of informing receivers that a data transfer (i.e., a file sent from a sender to receivers) is about to start. This involves sending a message to the "well known" ANNOUNCE session setup multicast group address where receiver hosts have joined and are listening for such messages. The message identifies the data product, its size, name, etc. In one embodiment of the invention, the "well-known" address is a public address. The public address is relevant in multicast transmission because separate multicast addresses may be used for product announcement and delivery. Any number of senders may announce products to a single public address and any number of receivers may join the multicast group defined by the public address. In another embodiment, the "well-known" address is a private address. The sender specifies the Private Address in the ANNOUNCE message for each product transfer. Only receivers that are authorized to receive a product actually join the multicast group defined by the private address.

The ANNOUNCE message can include a list of receivers that are allowed to receive the data included in the ANNOUNCE message. These receivers, called authorized receivers, are "authorized" by the application sending the ANNOUNCE to receive the data if the receiver finds its IP address or Global ID in the ANNOUNCE message. All other receivers are prohibited from receiving the data. Authorized receivers are used, in one embodiment of the invention, with closed groups (which are explained below).

Upon seeing the ANNOUNCE message at the group address, the receivers designated to join the group register with the sender sending a REGISTRATION message, unless there is some legitimate reason not to, e.g., there is not enough disk space to store the transmission, the receiver already has the content, or the receiver has been configured to reject content from that source. In these cases, the receiver sends back a REGISTRATION message with a "Decline" code (as described herein).

Registration is the process of a receiver informing a sender that the receiver intends to participate in the product transmission (also called a "session") that is currently being announced. The receiver does this by sending a REGISTRATION response message to the sender. This response is sent to the address specified by the "Response Address" parameter in the ANNOUNCE message. The response address is the IP address to which receivers send REGISTRATION messages, as well as Status, and DONE messages (which are explained later). The Response Address is specified in the ANNOUNCE message. The ability to specify an address other than the sender's address allows an intermediate entity to perform aggregation/relaying of the responses.

As explained below, because the sessions often involve very large numbers of receivers receiving content, a common problem is that not all group members receive the content successfully during the session. For example, some receivers may never have registered, such as when the receiver does not send REGISTRATION response message to the sender or when the receiver sends a REGISTRATION message but the sender never receives it. A receiver also may not register because the receiver is not connected to the group address or is not "listening" at it. These receivers are termed "Mute," because they never registered and therefore never participated in the original session. When this occurs, the sender does not transmit the content to the receiver during the regular sessions of transmitting data.

Another situation where receivers do not receive data during the regular session occurs when a receiver does send a REGISTRATION message that is received at the sender, but the REGISTRATION sent to the sender indicates that the receiver has declined to receive the content. These receivers are termed "Declined." Receivers can decline receiving content for many different reasons. For example, a receiver can decline because of lack of resources (e.g., lack of memory) or because of the presence of error conditions at the receiver end. A receiver also may decline because the receiver already has the content being sent. A REGISTRATION message with a decline message can provide an indication as to the reason that a receiver is declining.

For receivers that are "Mute" or "Declined," the invention provides a system and method for automatically creating a "mute/declined recovery" session that occurs at a time different than the regular session. During the mute/declined recovery session, the sender reschedules delivery of content to those receivers that did not receive data during the original session. Mute and declined group members are discovered in the session setup phase before data transfer starts.

Figure 3:
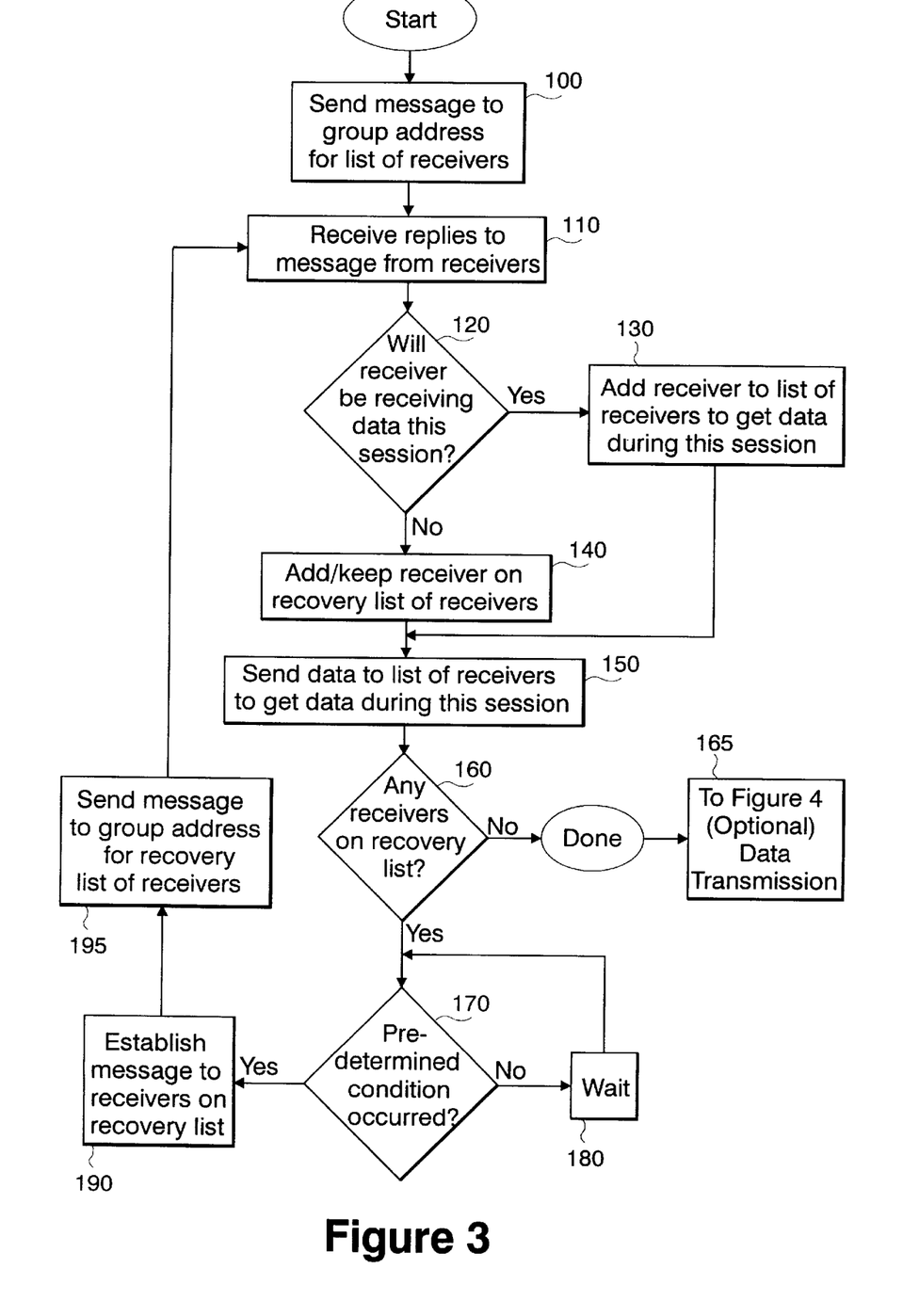
FIG. 3 is a flow chart of a method of managing a session of sending data to receivers that did not receive data during a session, in accordance with one embodiment of the invention.

FIG. 3 is a flow chart, in accordance with one embodiment of the invention, of a method for managing a session during which data is sent to receivers and a recovery list of receivers is established to reschedule data transmission to receivers that did not receive data during the original session. In FIG. 3, a Closed Group session is assumed (i.e. the sender has determined the composition of the group and will be directing those receivers to join the group). However, the methods described herein may be usable with other groups. First, the sender sends a message to a list of receivers (step 100). This message can comprise an ANNOUNCE message to direct the receivers on the list to join the group. As discussed previously, the ANNOUNCE message can relate to receiving data during a data session.

In response to the message sent in step 100, the receivers on the list send replies (step 110). At the end of the Announce/Registration session setup phase, a determination is made as to whether each receiver in the group will receive data during the session (step 120). This is done, in one embodiment, by analyzing the replies received in step 110. Those receivers that replied and that indicated that they will be receiving data are added to a list of receivers to receive data during the session (step 130). Those receivers that have been directed to join the group but who have not registered with the sender (i.e., Mute receivers) and those receivers that register but have declined in their registrations (i.e., Declined receivers) are added to a recovery list of receivers (step 140).

The recovery list of receivers, in this embodiment, is a list of receivers that will not be receiving data during the regular data session. As discussed above, the recovery list of receivers can be determined by seeing which receivers have not replied to the ANNOUNCE message with a REGISTRATION message and by seeing which receivers have registered, but have declined. Data (also referred to as content) can be sent to the recovery list of receivers at a time different than the regular data session. In one embodiment, the sender of the data determines in advance when to try to send the content to the receivers on the recovery list so that the entire group, including those found mute or decline initially, is all brought up to date with content.

For example, the recovery session (which is the session during which data is sent to receivers on the recovery list) can be programmed to occur some time later than the initial session. This can provide sufficient time for a receiver to re-establish a link to the network, to give time to correct the problem of lack of connectivity to the mute receivers, or to free up resources or correct error conditions for those receivers that declined in the initial session. This time interval can be any length of time desired. For example, a time interval can last several hours. A recovery session may also begin after the occurrence of other predetermined or preconfigured conditions, such as after a certain portion of the receivers have been reconnected to the network, after a sender or receiver determines that error conditions no longer exist, etc. Those skilled in the art will recognize that many different conditions may be used to trigger the start of a recovery session.

A recovery session can be automatic, so that after the time interval or other condition has occurred or elapsed, the recovery session will begin immediately. In addition, the parameters for the recovery session, such as system timeout, transmission rate, and the like, can be set and/or adjusted based on data known to the system, such as error messages, messages from the receivers, system congestion (which is discussed more fully below) and the like. Typically, a recovery session for mute and/or declined receivers will include transmitting to the receivers, over the network, all of the data that was sent during the regular data session. This is because the mute and declined receivers on the recovery list received no content during the original session.

In the embodiment of FIG. 3, after the content is sent to the receivers during the regular data session (step 150), if there are no receivers on the recovery list (step 160), then the session is done. If, however, there are receivers on the recovery list (step 160), the recovery session for sending data to the receivers on the recovery list does not occur until the occurrence of a predetermined condition (steps 170 and 180). For example, the predetermined condition may comprise reaching a time limit or receiving one or more messages from one or more receivers on the recovery list indicating that the receiver is ready to receive data. Those skilled in the art will recognize that other predetermined conditions may be useful, depending on the reasons why a receiver did not receive data. In addition, it should be understood that an operator or user on the network can preconfigure or program a recovery session for mute or declined receivers (as well as one for incomplete receivers, which is described more fully below) in advance.

When the predetermined condition is reached, a message is sent to the group address for the receivers on the recovery list (steps 190 and 195) inviting the receivers again to receive content. Thus, steps 110 through 195 can be repeated again. In some instances, some (or all) receivers on the recovery list could again be Mute or Declined, so that steps 110 through 195 would have to be repeated until there are no receivers on the recovery list (step 160)—that is, until all receivers have received the content. However, in another embodiment (not shown in FIG. 3), instead of repeating steps 110 through 195 until there are no receivers on the recovery list, these steps could be repeated until a predetermined condition occurs, such as a system timeout. After a system timeout or a condition wherein there are no receivers on the recovery list, processing is complete. However, in one embodiment of the invention, data transmission with recovery for incomplete receivers, in accordance with FIG. 4, can then occur (step 165). This procedure is described more fully below.

Another problem that can occur during distribution of product to receivers is when receivers do not receive all of the content. After the product announcement phase is completed, the sender begins the transmission of the product. Product delivery is the process of transmitting the data product from a sender to receivers. The data is transmitted in data transfer units (DTU). A group of DTUs is called a block. The transmission of the entire data product once is called the first pass or first session. No DTU retransmissions occur during the first session. Rather, an additional type of recovery session, called an incomplete recovery session, is set up, as described below, when retransmissions are required. However, only the missed DTUs are retransmitted on each subsequent retransmission. This phase can be preceded by the product announcement phase described above.

Generally, when data transmission is complete, those receivers that have received all of the data send a DONE message to the sender to indicate that the receiver has received a complete data product. The sender maintains a completion list of receivers that have confirmed receipt of a data product and sends out a completion message to the receivers to indicate that it confirms that the receiver has received a complete data product. However, for those receivers that do not send DONE messages to the sender or for those receivers that registered but send messages to the sender indicating that they did not receive all or part of the content, the invention provides for additional recovery sessions.

Group members in an original session that do not finish receiving content when the session completes can be grouped together to create an incomplete recovery session. Incomplete recovery sessions can, in some embodiments, be preconfigured to start immediately after the original session. An incomplete recovery session effectively can be a re-start session; that is, because the group members have already received some content from the original session, they do not need to receive all of the content over again, such as would occur with the mute and/or declined recovery sessions described above. Instead, during an incomplete recovery session, the receivers found to be "incomplete" will receive only the data that they are missing.

As was discussed with mute and declined recovery sessions, in some incomplete recovery sessions, session parameters may be changed depending on information known about the network and/or the receivers. For example, the transmission rate for an incomplete session can be reduced to minimize problems with congestion or host receiver buffer overflow, which are common reasons for group members not receiving all data during the original data session.

Figure 4:
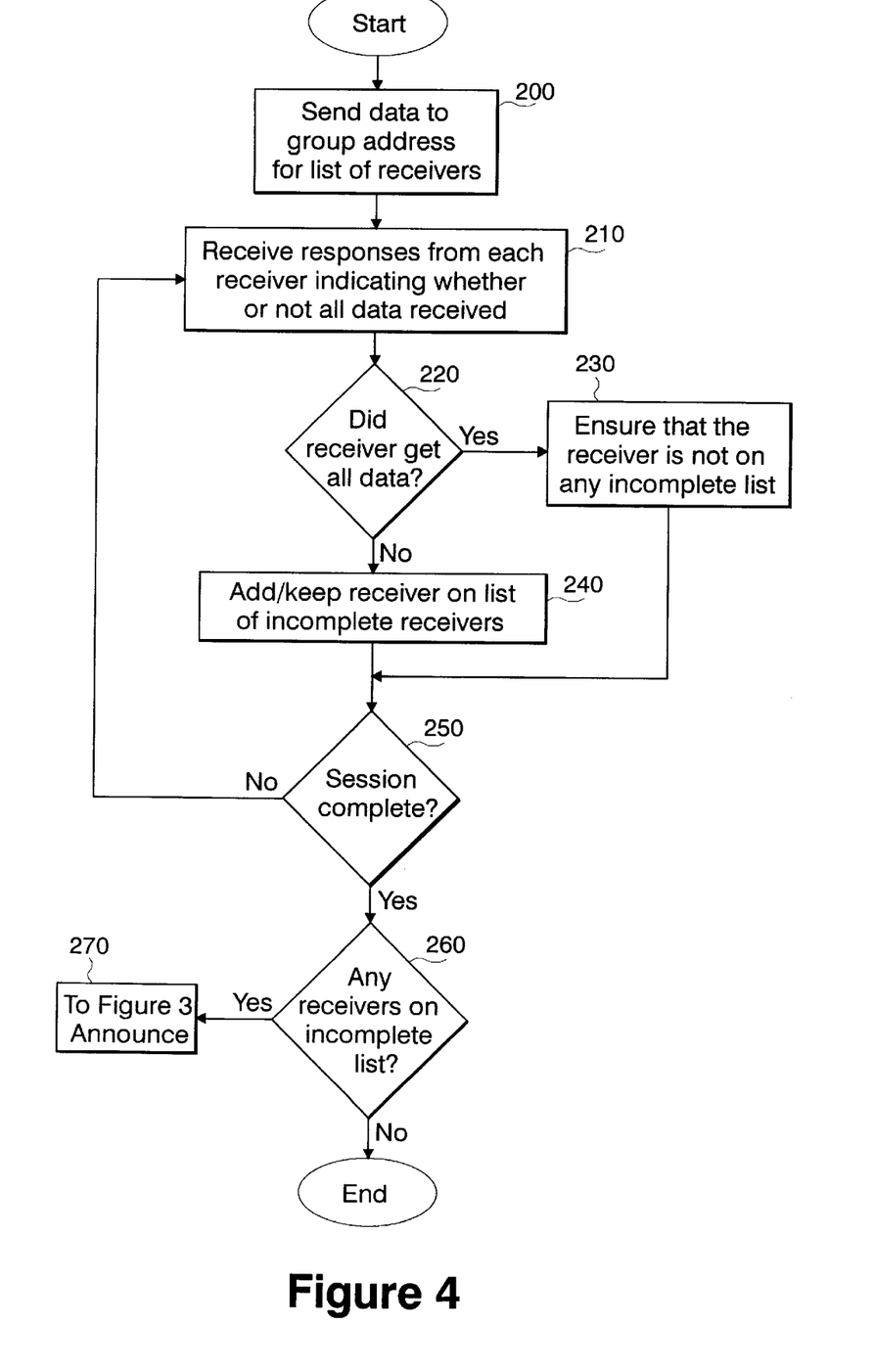
FIG. 4 is a flow chart of a method of managing a session of sending data to receivers that did not receive all data during a session, in accordance with another embodiment of the invention.

FIG. 4 is a flow chart illustrating a method for establishing an incomplete recovery session, in accordance with one embodiment of the invention. FIG. 4 starts with the sending of data during the original data session (step 200). After a sender sends data to a list of receivers, such as by sending data to the group address for the list of receiver, the sender receives responses from each receiver (step 210). The responses received will indicate to the sender whether or not a receiver has received all of the data. For example, if during a session, a sender sends a block of five DTUs, the sender will expect to receive from each receiver a DONE messages confirming to the sender that a particular receiver has received that block of data. For example, a sender can send a block of five DTUs, say $DTU_1$, $DTU_2$, $DTU_3$, $DTU_4$, and $DTU_5$, to a receiver, and get back a DONE message indicating that only $DONE_1$, $DONE_3$, and $DONE_5$ were received. Thus, the sender can determine whether or not a receiver received all of the data, and which data needs to be retransmitted (in this example that $DTU_2$ and $DTU_4$ need to be retransmitted) to that receiver during the incomplete recovery session.

Referring again to FIG. 4, if the sender determines that a receiver did get all of the data (step 230), the receiver will not be put an incomplete recovery list and will be deleted from any incomplete recovery lists relating to that data on which the receiver is listed. If, however, the sender determines that a receiver did not get all data, then the receiver is added to a list of incomplete receivers (step 240), or kept on that list, if the receiver is already on such a list. Receivers that did not receive all of the data during the session are continually added to the incomplete recovery lists until the original session is complete (step 250). Typically, a session will be complete when a sender has sent all of its data and a particular condition, such as a session timeout, has occurred. However, it should be understood that many different ways of ending a session are usable within the spirit and scope of the invention.

Figure 5:
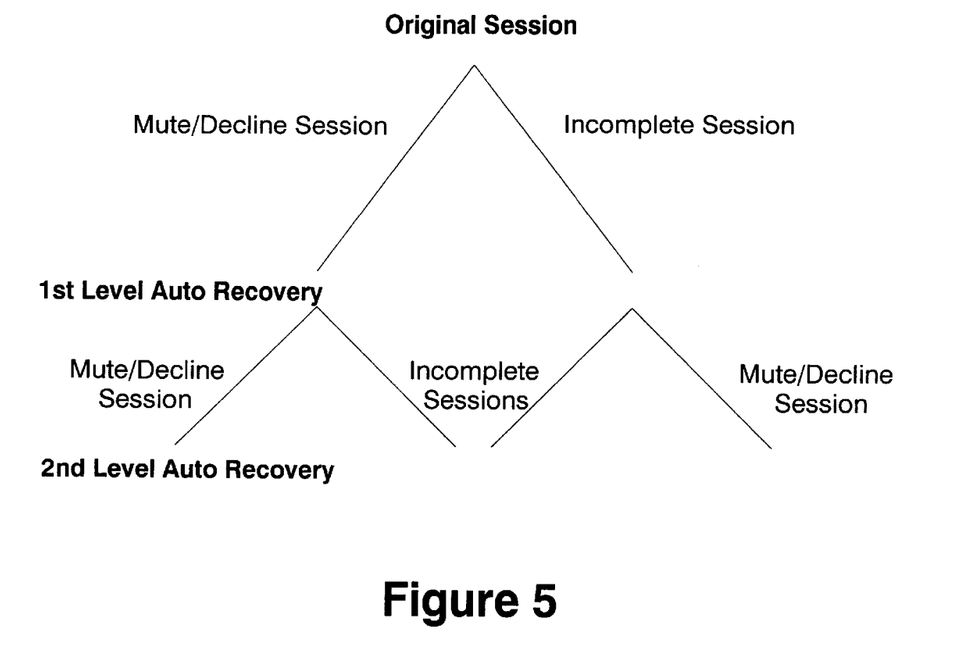
FIG. 5 is a diagram of the recovery sessions of data that can arise using the methods of FIG. 3 and 4.

When the original session is done, if there are no receivers on the incomplete recovery list (step 260), then no incomplete recovery session is scheduled and processing is complete. If, however, there are receivers on the incomplete recovery list, then the sender establishes an incomplete recovery session whereby the data that was "missed" during the original session is retransmitted to the receivers on the incomplete recovery list (step 270). This is done by repeating the steps in FIG. 3 (i.e., inviting the receivers to join the incomplete recovery session). Thus, receivers that were originally incomplete may be mute or decline after being invited to join an incomplete recovery session in step 100 of FIG. 3. This may occur, for example, if the receiver has a lack of resources or an error condition. Thus, a "tree" of different types of recovery sessions may result. Such a tree is illustrated graphically in FIG. 5, which shows that, in accordance with on embodiment of the invention, there can be many levels of recovery in a session based, depending on how the network and/or system is configured. Additionally, rather than continuing to spawn $N^2$ new sessions where N is the auto recovery level, the categories of auto recovery sessions can be combined. For example, in FIG. 5 above, the second level (N=2) can create Incomplete sessions from two branches which can be combined. It also can create Mute/Decline sessions from two branches that can be combined for the $2^{nd}$ level auto recovery.

In another embodiment of the invention, it may not be desirable to create two different types of recovery session. For example, a sender may establish one type of recovery session but can make selections as to its membership. This embodiment is termed a "hybrid" recovery session. Thus, a recovery session can comprise both failed and incomplete members, failed members only, incomplete members only, and partial combinations of members that require recovery. In another embodiment, a sender can maintain separate lists of receivers along with the type of recovery that the receivers need, for an "all-inclusive" type of recovery session. In this example, the sender, if establishing an all inclusive recovery group, may decide to delay the recovery session for mute/decline group members and reduce the transfer rate of the auto recovery session for incomplete group members.

Figure 6:
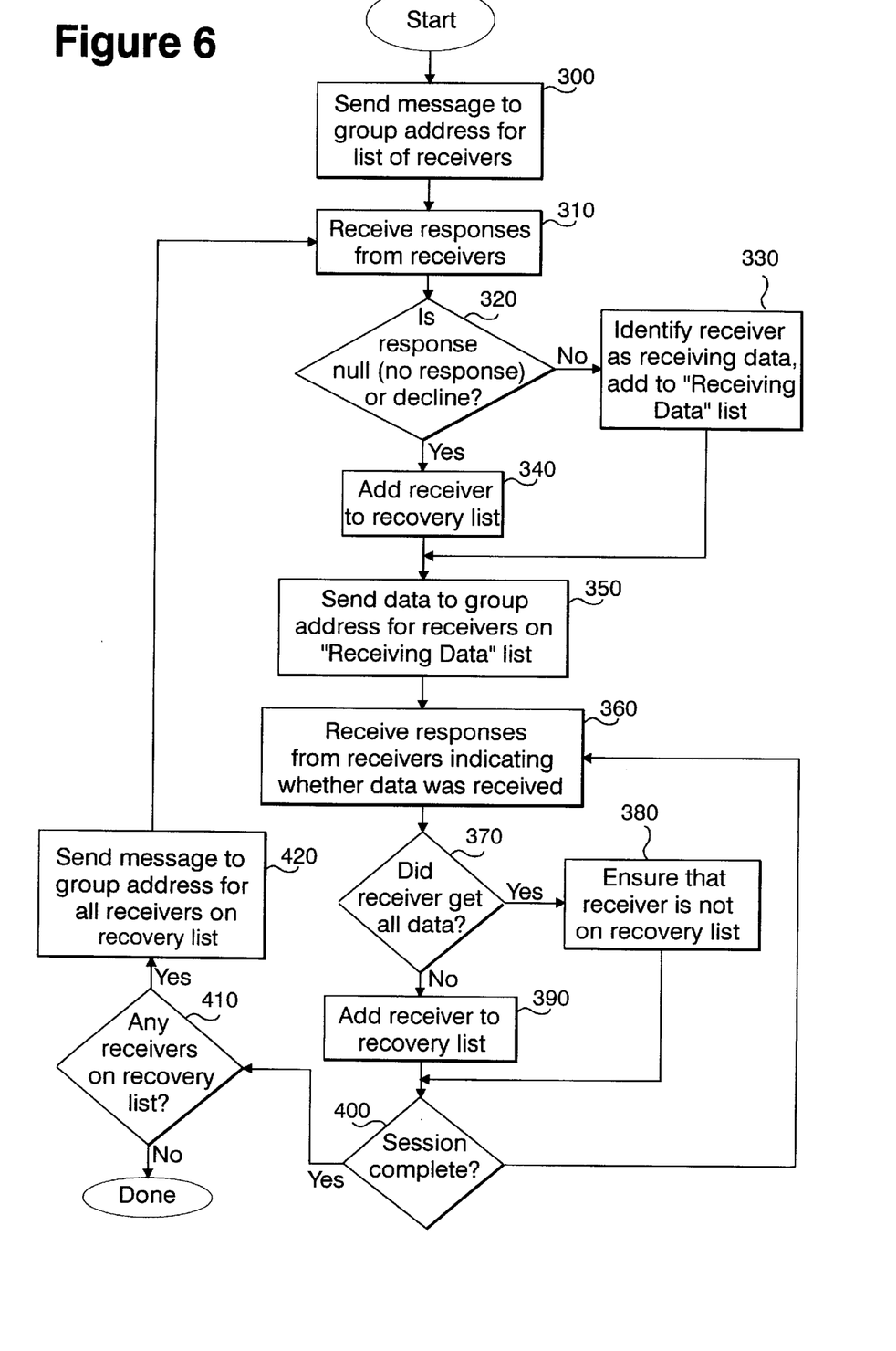
FIG. 6 is a flow chart of a method of managing a session of sending data to receivers that did not receive all or part of the data sent during a session, in accordance with an embodiment of the invention.

FIG. 6 is an illustration of a method of managing a session of data using hybrid recovery sessions, in accordance with one embodiment of the invention. A message relating to receiving data during a first session is sent to a group of receivers (step 300), and responses are received at the sender (step 310). If the response is a decline or if no response was received from the receiver (step 320), which is termed a "null" response, then the receiver is added to the recovery list (step 340). Optionally, each receiver may also be identified on the recovery list with information specific to the reason why it is on the list (e.g., that it is mute or that it is incomplete) so that, during the recovery session, the information sent to the receiver can be tailored to the information that the receiver actually needs.

If a receiver responds by registering, the receiver is identified as one that will be receiving data during the session (step 330). Data transmission during the original session, to those receivers that registered, then begins (step 350). Although not illustrated in FIG. 6, in some embodiments of the invention the sender will wait until a predetermined condition has occurred, such as a system timeout, before sending data.

In response to the data sent to the receivers, the sender receives responses that will indicate to the sender, as described previously, whether or not the sender has received all of the data (steps 360 and 370). If a receiver indicates that it has not received all of the data, then it is put on a recovery list (step 390). If, however, the receiver indicates that it has received all of the data, then the receiver is not put on a recovery list (step 380). In some instances, a receiver may actually be receiving data during a recovery session when it sends responses that indicate to the sender that it has received all of the data. In that instance, the sender will ensure that the receiver is removed from the recovery list (step 380).

When the session is complete (step 400), the sender determines whether any receivers are (or remain) on the recovery list (step 410). If there are receivers on this list, then the sender begins the recovery session by sending a message inviting the receivers on the recovery list to join the recovery data session (step 420), and steps 300 through 420 are repeated as necessary until no receivers are on the recovery list (that is, until all receivers have indicated to the sender that they have received all data). It should be understood that, in some embodiments, the parameters of the recovery session may be adjusted based on the receivers that are on the recovery list and the associated information that the sender has about these receivers. For example, a recovery session may be delayed, to accommodate receivers on the recovery list that are identified as mute or declined, and the recovery session may also be set at a reduced transfer rate, to accommodate receivers on the recovery list that are identified as incomplete. In another embodiment (not shown in FIG. 6), steps 300 through 420 will repeat until the occurrence of a predetermined condition, such as the expiration of a time limit. Those skilled in the art will recognize that many different predetermined conditions, such as system errors, bandwidth measurements, congestion problems, messages from receivers, and the like, may be used to end a recovery session (or even to end an announce session or a data session).

In still another embodiment of the invention, the recovery sessions described herein can be used to reduce congestion on the network, especially if content is being delivered without having a real-time requirement imposed on the delivery (that is, content that need not be delivered within a limited time).

In this embodiment, receivers have the ability to detect loss at their end without communication with the sender. A receiver can, for example, have a loss threshold. If loss is detected to be over this threshold, the receiver can be required to leave the group during the data transmission session. To relieve congestion, the receiver can notify the sender of its leaving and tells the sender what its loss measurement actually was. The sender, upon receiving these indications, may set up one or more recovery groups based on the loss measurements, where each recovery group could transmit data at a different speed. For example, if one receiver reported 25% loss measurement and another reported 90% loss measurement, two different recovery speed groups would be set up, each transmitting data at a different rate.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method of managing a session during which data is sent to receivers, comprising:
    (a) sending over a network a first message to a list comprising at least one receiver, the first message relating to receiving data during a first session;
    (b) receiving replies over the network from the receivers on the list;
    (c) identifying, based on the replies received in step (b), each receiver on the list that will not be receiving data during the first session; and
    (d) sending, after the first session is complete, a second message over the network to the receivers identified in step (c), the second message relating to receiving data during a second session.

2. The method of claim 1 further comprising the step of transferring a first data set over the network during a first session to those receivers that replied in step (b).

3. The method of claim 1 further comprising the steps of:
    (e) receiving replies over the network from the receivers that received the second message;
    (f) identifying, based on the replies received to the second message, each receiver that will be receiving data during the second session; and
    (g) transferring the first data set over the network during the second session, where the first data set is sent to the receivers identified as receiving data.

4. The method of claim 1, further comprising the step of:
    (e) repeating steps (b), (c), and (d), until a predetermined condition occurs.

5. The method of claim 4 wherein the predetermined condition of step (e) comprises there being no receivers identified in step (c) as not receiving data.

6. The method of claim 4 wherein the predetermined condition of step (e) comprises reaching a time limit.

7. The method of claim 4 wherein the predetermined condition of step (e) comprises receiving a message from a receiver that did not receive data during the first session, the message indicating that the receiver is ready to receive data.

8. The method of claim 1 wherein the step of identifying each receiver further comprises identifying each receiver that did not reply to the first message.

9. The method of claim 1 wherein step (c) further comprises:
    (c-a) identifying each receiver that sent a reply in step (b) indicating that it will not be receiving data during the first session.

10. The method of claim 9 wherein step (c) further comprises:
    (c-b) identifying a reason for why a receiver sent a reply in step (b) indicating that it will not be receiving data during the first session.

11. The method of claim 10 further comprising the step of:
    (e) repeating steps (a), (b), (c), and (d) until the reason of step (c-a) no longer exists.

12. The method of claim 1, wherein the first and second messages are sent to a group address location accessible to the receivers.

13. A method of managing a session during which data is sent to receivers, comprising:
    (a) sending over a network a first message to a list comprising at least one receiver, the first message relating to receiving data during a first session;
    (b) receiving replies over the network from the receivers on the list;
    (c) identifying, based on the replies received in step (b), each receiver on the list that will not be receiving data during the first session;
    (d) sending, after the first session is complete, a second message over the network to the receivers identified in step (c) the second message relating to receiving data during a second session;
    (e) identifying, after the transferring of data during the first session has begun, those receivers that did not receive all data during the first session; and
    (f) sending, after the first session is complete, a third message over the network to those receivers identified in step (e) the third message relating to receiving missing data during a third session.

14. The method of claim 13, further comprising the step of:

(g) repeating steps (b) through (f) until all receivers have received all the data.

15. The method of claim 13 wherein step (e) occurs before step (d).

16. A method of managing a session during which data is sent to receivers, comprising:

(a) sending over a network a first message to a first list comprising at least one receiver, the first message relating to receiving data during a first session;

(b) receiving replies over the network from the receivers on the first list;

(c) identifying, based on the replies received in step (b), whether or not each receiver on the list will be receiving during the first session and establishing a second list comprising those receivers that will not be receiving data;

(d) identifying, after the transferring of data during the first session has begun, those receivers that did not receive all data during the first session and establishing a third list comprising those receivers that did not receive all data during the first session;

(e) establishing, after the first session is complete, a second message including a fourth list that comprises at least one of the second list and the third list, the second message relating to receiving data during a second session; and (f) sending the second message to the receivers on the fourth list after the first session is complete.

17. The method of claim 16, further comprising the step of:

(h) repeating steps (b) through (f) until a predetermined condition occurs.

18. The method of claim 17, wherein the predetermined condition comprises all receivers on the first list receiving all of the data that was transferred during the first session.

19. The method of claim 16 wherein the second message comprises a fifth list comprising both the first list and the second list.

20. The method of claim 16 wherein step (a) further comprises sending over a network a first message to a first list comprising at least one receiver, the first message relating to receiving data at a first rate during a first session and where step (f) further comprises sending the second message to the receivers on the third list, where the second message relates to receiving data at a second rate over the network.

21. The method of claim 20 where step (f) further comprises sending over the network the second message at a second rate that is different from the first rate.

22. The method of claim 20, where step (f) further comprises sending over the network the second message to the receivers on the second list after a time delay.

23. A method of managing a session during which data is sent to receivers, comprising:

(a) receiving a reply over a network from at least one receiver receiving data over a network during a first session, the reply indicating that the receiver will no longer receive data;

(b) establishing, if the reply of step (a) includes a loss rate, another message that includes a list comprising receivers having loss rates that are substantially equivalent, wherein the list is associated with a second session for sending data at a rate that is based on the loss rate received in the reply of step (a); and (c) sending, after the first session is complete, each message established in step (b) to the list of receivers associated with each message.

* * * * *